(12) United States Patent
Taketani et al.

(10) Patent No.: US 9,701,822 B2
(45) Date of Patent: Jul. 11, 2017

(54) TOUGHNESS MODIFIER FOR CURABLE RESIN, AND CURABLE RESIN COMPOSITION

(71) Applicant: KANEKA CORPORATION, Osaka (JP)

(72) Inventors: Shuji Taketani, Westerlo-Oevel (BE); Yoshio Furukawa, Takasago (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 14/375,662

(22) PCT Filed: Feb. 5, 2013

(86) PCT No.: PCT/JP2013/052548
§ 371 (c)(1),
(2) Date: Jul. 30, 2014

(87) PCT Pub. No.: WO2013/118697
PCT Pub. Date: Aug. 15, 2013

(65) Prior Publication Data
US 2014/0371350 A1    Dec. 18, 2014

(30) Foreign Application Priority Data

Feb. 7, 2012 (JP) ................................ 2012-024424

(51) Int. Cl.
| | | |
|---|---|---|
| *C08F 220/14* | (2006.01) | |
| *C08L 9/10* | (2006.01) | |
| *C08L 51/04* | (2006.01) | |
| *C08G 59/02* | (2006.01) | |
| *C08L 63/00* | (2006.01) | |
| *C08F 279/02* | (2006.01) | |
| *C08F 2/26* | (2006.01) | |
| *C08G 59/32* | (2006.01) | |
| *C08G 59/50* | (2006.01) | |

(52) U.S. Cl.
CPC ...... *C08L 9/10* (2013.01); *C08F 2/26* (2013.01); *C08F 279/02* (2013.01); *C08G 59/02* (2013.01); *C08G 59/3218* (2013.01); *C08G 59/3227* (2013.01); *C08G 59/504* (2013.01); *C08L 51/04* (2013.01); *C08L 63/00* (2013.01)

(58) Field of Classification Search
CPC ............... C08F 2/30; C08L 9/10; C08G 59/02
See application file for complete search history.

(56) References Cited

U.S. PATENT DOCUMENTS

| | | | | |
|---|---|---|---|---|
| 4,788,233 A * | 11/1988 | Sakakibara | ........ | C08G 59/4021 523/400 |
| 4,857,566 A | 8/1989 | Helbling | | |
| 2002/0111420 A1 | 8/2002 | Papathomas | | |
| 2003/0114580 A1* | 6/2003 | Kim et al. | ............ | 524/534 |
| 2004/0157956 A1* | 8/2004 | Vincent | ........ | C09D 11/32 523/160 |
| 2006/0041062 A1* | 2/2006 | Choi et al. | ............ | 525/63 |
| 2007/0027263 A1 | 2/2007 | Furukawa et al. | | |
| 2007/0219294 A1 | 9/2007 | Ueda | | |
| 2007/0251419 A1* | 11/2007 | Yamaguchi | ....... | C08F 279/02 106/287.13 |
| 2008/0308212 A1* | 12/2008 | Sheasley et al. | ........ | 156/78 |
| 2011/0048637 A1* | 3/2011 | Kohli | ....... | C09J 163/00 156/307.1 |
| 2011/0190449 A1* | 8/2011 | Miyatake | ....... | C08G 59/506 525/187 |

FOREIGN PATENT DOCUMENTS

| | | |
|---|---|---|
| CN | 1134427 A | 10/1996 |
| CN | 1860175 A | 11/2006 |
| CN | 1918194 A | 2/2007 |
| CN | 101772532 A | 7/2010 |
| EP | 1 739 102 A1 | 1/2007 |
| JP | 6-49108 A | 2/1994 |
| JP | 06-049108 A | 2/1994 |
| JP | 2003-003035 A | 1/2003 |
| JP | 2003-3035 A | 1/2003 |
| JP | 2004-518796 A | 6/2004 |
| JP | 2006188619 A * | 7/2006 |
| JP | 2008-291152 A | 12/2008 |
| WO | 2005/028546 A1 | 3/2005 |
| WO | 2006/038768 A1 | 4/2006 |

(Continued)

OTHER PUBLICATIONS

Latemul reactive nonionic emulsifiers website.*
International Search Report dated Apr. 2, 2013, issued in corresponding application No. PCT/JP2013/052548.
International Preliminary Report on Patentability (form PCT/IB/373) dated Aug. 12, 2014, issued in International Application No. PCT/JP2013/052548, with form PCT/ISA/237 (5 pages).
Liang Zhiqi et al., "Funcrional Surfactant", The China Light Industry Press, Apr. 30, 2002, pp. 7-12, 14.
Office Action dated Nov. 3, 2015, issued in counterpart Chinese Application No. 201380008346.X, with English translation. (16 pages).
Database WPI AN 1987-133421 (XP 002744175), cited in Extended European Search Report dated Sep. 15, 2015, issued in counterpart European Patent Application No. 13746769.0 (2 pages).

(Continued)

*Primary Examiner* — Mark Kaucher
(74) *Attorney, Agent, or Firm* — Westerman, Hattori, Daniels & Adrian, LLP

(57) ABSTRACT

Provided are a toughness modifier for a curable resin which has good dispersibility in a curable resin containing a thermoplastic resin as well as in a cured product formed from a curable resin composition, and also has an excellent toughness-improving effect; and a curable resin composition containing the toughness modifier. The toughness modifier for a curable resin (D) is obtained by emulsion-polymerizing 5 to 50% by mass of a vinyl monomer (B) in the presence of 50 to 95% by mass of a rubber polymer (A) latex (calculated as the rubber polymer component) using 0.5 to 15 parts by mass of a nonionic reactive surfactant (C) (relative to 100 parts by mass of a total of (A) and (B)).

10 Claims, No Drawings

(56) References Cited

FOREIGN PATENT DOCUMENTS

WO 2007/118111 A1 10/2007
WO 2008/157129 A1 12/2008

OTHER PUBLICATIONS

Database WPI AN 2001-034904 (XP 002744176), cited in Extended European Search Report dated Sep. 15, 2015, issued in counterpart European Patent Application No. 13746769.0 (2 pages).
Office Action dated Jun. 15, 2016, issued in counterpart Chinese Application No. 201380008346.x, with English translation (16 pages).

* cited by examiner

TOUGHNESS MODIFIER FOR CURABLE RESIN, AND CURABLE RESIN COMPOSITION

TECHNICAL FIELD

The present invention relates to a toughness modifier for a curable resin which has good dispersibility in a curable resin containing a thermoplastic resin as well as in a cured product formed therefrom, and also has an excellent toughness-improving effect. The present invention also relates to a curable resin composition containing the toughness modifier.

BACKGROUND ART

Curable resins such as phenolic resins, unsaturated polyester resins and epoxy resins are excellent in heat resistance, mechanical strength and dimensional accuracy and are thus widely used in various fields. Meanwhile, formed articles formed from curable resins such as epoxy resins show the problem of high brittleness owing to their low fracture toughness.

Adding a rubber component in an epoxy resin composition is known as a method for enhancing toughness by adding a modifier to an epoxy resin.

Examples of such a method of adding a rubber component include a method of adding a reactive liquid rubber (e.g. CTBN) or a nitrile rubber and a method of mixing a core-shell polymer with an epoxy resin. However, reactive liquid rubbers undergo a process in which they are temporarily dissolved in epoxy resins and then phase separation occurs during curing. Thus, the morphology of a cured product formed from such a reactive liquid rubber varies depending on the type of epoxy resin used and the particular curing conditions, which results in failing to achieve a desired modifying effect and in a problem with reproducibility in quality. It is also known that part of the rubber component remained dissolved in the cured epoxy resin phase lowers the elastic modulus and the glass-transition temperature of the cured product to cause problems including a reduction in quality of the final epoxy resin product. Moreover, the method of adding a core-shell polymer to an epoxy resin allows to suppress reduction of glass-transition temperature but has the following problem. Commercially available core-shell polymers are provided as aggregates (agglomerates) of primary particles, for example, in a powder form with a particle size of several tens to several hundreds of micrometers. To mix such a core-shell polymer with an epoxy resin, the core-shell polymer needs to be finely divided so that the particle size is less than 10 μm and, furthermore, they require to be thoroughly mixed by a kneading machine, such as a stirrer with heating means at 50° C. to 200° C., a high shear stirrer, a heating roller, an intermixer, a kneader, or a three-roll mill; otherwise, there is the problem that the mixed core-shell polymer easily precipitates or floats up and is separated.

Meanwhile, Patent Literature 1 discloses a method for producing a resin composition containing well-dispersed rubber polymer particles with a decreased amount of impurities. The method includes mixing an aqueous latex of rubber polymer particles with an organic solvent which is partially soluble in water; contacting the resulting mixture with water to form aggregates of rubber polymer particles; separating the aqueous phase from the mixture of the aggregates and the aqueous phase to recover the aggregates of rubber polymer particles with a decreased amount of impurities; adding an organic solvent to the aggregates to prepare a dispersion; mixing the dispersion with a reactive group-containing polymerizable organic compound such as an epoxy resin; and distilling off volatile components. Such a method, however, still has room for further improvement in achieving good dispersibility in a curable resin containing a thermoplastic resin, as well as in achieving good dispersibility in and toughness of a cured product formed from a curable resin composition.

CITATION LIST

Patent Literature

Patent Literature 1: WO 05/028546

SUMMARY OF INVENTION

Technical Problem

One of the objects of the present invention is to provide a toughness modifier for a curable resin which has good dispersibility in a curable resin containing a thermoplastic resin as well as in a cured product formed from the curable resin, and also has an excellent toughness-improving effect. Another object of the invention is to provide a curable resin composition containing the toughness modifier.

Solution to Problem

The inventors of the present application have conducted intensive studies to solve the above problems, and found that emulsion polymerization of a vinyl monomer in the presence of a rubber polymer latex using a nonionic reactive surfactant provides a toughness modifier for a curable resin which has good dispersibility in a curable resin particularly containing a thermoplastic resin as well as in a cured product formed from the curable resin, and also has an excellent toughness-improving effect.

Thus, the present invention relates to a toughness modifier for a curable resin (D), the toughness modifier being obtained by emulsion-polymerizing, in the presence of 50 to 95% by mass of a rubber polymer (A) latex (calculated as a rubber polymer component), 5 to 50% by mass of a vinyl monomer (B) using 0.5 to 15 parts by mass of a nonionic reactive surfactant (C) (relative to 100 parts by mass of a total of (A) and (B)).

Preferably, the rubber polymer (A) includes a rubber elastic body formed from 50 to 100% by mass of at least one monomer selected from diene monomers and (meth)acrylate monomers, and 0 to 50% by mass of another copolymerizable vinyl monomer; a polysiloxane rubber elastic body; or a mixture thereof, and the vinyl monomer (B) includes at least one selected from the group consisting of (meth) acrylate monomers, aromatic vinyl monomers, vinyl cyanide monomers, unsaturated acid derivatives, (meth)acrylic acid amide derivatives, and maleimide derivatives.

The nonionic reactive surfactant (C) is preferably a polyoxyalkylene alkenyl ether.

The nonionic reactive surfactant (C) is preferably represented by the formula (1):

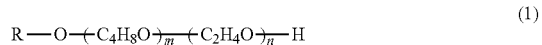

(1)

wherein R represents a terminal double bond-containing alkenyl group; m denotes a number from 2 to 50; and n denotes a number from 2 to 100.

Preferably, the toughness modifier has a trilaminar structure and is obtained by polymerizing, in the presence of the rubber polymer (A) latex, a vinyl monomer (B1) and a monomer (E) that has at least two radically polymerizable groups per molecule, to form an intermediate coating layer, followed by emulsion polymerization of a vinyl monomer (B2) using the nonionic reactive surfactant (C).

The present invention also relates to a method of producing a toughness modifier for a curable resin (D), the method including emulsion-polymerizing, in the presence of 50 to 95% by mass of a rubber polymer (A) latex (calculated as a rubber polymer component), 5 to 50% by mass of a vinyl monomer (B) using 0.5 to 15 parts by mass of a nonionic reactive surfactant (C) (relative to 100 parts by mass of a total of (A) and (B)).

The present invention also relates to a curable resin composition, containing 20 to 99.5% by mass of a curable resin (D) and 0.5 to 80% by mass of the toughness modifier of the present invention.

The curable resin composition is preferably prepared by a method including the steps of:

a first step of mixing an aqueous latex containing the toughness modifier with an organic solvent having a solubility in water at 20° C. of 5 to 40% by mass, and then with excess water to allow the toughness modifier to loosely aggregate;

a second step of separating and recovering the loose aggregates of the toughness modifier from a liquid phase, and then mixing the recovered toughness modifier with an organic solvent again to prepare a dispersion of the toughness modifier in the organic solvent; and a third step of further mixing the dispersion in the organic solvent with the curable resin (D), and then distilling off the organic solvent.

The curable resin composition preferably further contains a thermoplastic resin (F).

The thermoplastic resin (F) is preferably at least one selected from the group consisting of polyethersulfone, polyetherimide, phenoxy resins, and novolac resins.

The toughness modifier is preferably dispersed as primary particles in a matrix of a cured product formed from the curable resin composition.

The present invention also relates to a cured product, formed from the curable resin composition of the present invention.

Advantageous Effects of Invention

The toughness modifier for a curable resin of the present invention has good dispersibility in a curable resin and in a matrix of a cured product formed from the curable resin, as well as good dispersibility in a curable resin containing a thermoplastic resin. In addition, a formed cured product containing the toughness modifier shows excellent toughness.

DESCRIPTION OF EMBODIMENTS (Toughness modifier)

The toughness modifier of the present invention is obtained by emulsion-polymerizing 5 to 50% by mass of a vinyl monomer (B) in the presence of 50 to 95% by mass of a rubber polymer (A) latex (calculated as the rubber polymer component) using 0.5 to 15 parts by mass of a nonionic reactive surfactant (C) (relative to 100 parts by mass of a total of (A) and (B)).

The toughness modifier may preferably have a trilaminar structure consisting of a core, an intermediate coating layer, and an outermost layer because such a structure can highly enhance dispersibility in a curable resin and in a curable resin containing a thermoplastic resin.

The particle size of the toughness modifier is not particularly limited, as long as the toughness modifier can be stably provided in an aqueous latex form. The volume average particle size of the toughness modifier is preferably about 0.03 to 2 μm and more preferably about 0.05 to 1 μm because such a toughness modifier can be easily produced in terms of industrial productivity.

(Rubber Polymer (A))

Any polymer can be used, without limitation, to form the rubber polymer (A), and may preferably be a rubber elastic body formed from 50 to 100% by mass of at least one monomer selected from the group consisting of diene monomers (particularly conjugated diene monomers) and (meth) acrylate monomers, and 0 to 50% by mass of another copolymerizable vinyl monomer; a polysiloxane rubber elastic body; or a mixture of these elastic bodies.

As used herein, the term "(meth)acrylic" means acrylic and/or methacrylic.

The polymer forming the rubber polymer (A) is in a crosslinked form and thus can be swollen in an appropriate solvent but is not substantially dissolved therein. The rubber polymer (A) is insoluble in the curable resin (D). The gel content of the rubber polymer (A) is preferably not less than 60% by mass, more preferably not less than 80% by mass, still more preferably not less than 90% by mass, and most preferably not less than 95% by mass. The polymer forming the rubber polymer (A) may preferably have a glass-transition temperature (Tg) of not higher than 0° C., more preferably not higher than −10° C.

Examples of the diene monomers that can be used to form the rubber elastic body include conjugated diene monomers such as butadiene, isoprene, and chloroprene. Butadiene is particularly preferred in view of polymerizability and availability.

Examples of the (meth)acrylate monomers include butyl acrylate, 2-ethylhexyl acrylate, and lauryl methacrylate. Butyl acrylate and 2-ethylhexyl acrylate are particularly preferred in view of polymerizability and availability. These monomers may be used alone or in combinations of two or more.

Moreover, the rubber elastic body may be a copolymer of a diene monomer or a (meth) acrylate monomer with another vinyl monomer copolymerizable therewith. Examples of the vinyl monomer copolymerizable with a diene monomer or a (meth) acrylate monomer include monomers selected from the group consisting of aromatic vinyl monomers and vinyl cyanide monomers. Examples of the aromatic vinyl monomers include styrene, α-methylstyrene, and vinylnaphthalene. Examples of the vinyl cyanide monomers include (meth)acrylonitrile and substituted acrylonitriles. These may be used alone or in combinations of two or more.

The amount of the at least one monomer selected from the group consisting of diene monomers and (meth) acrylate monomers is preferably not less than 50% by mass, and more preferably not less than 60% by mass, relative to the mass of the whole rubber elastic body. If the amount of the monomer is less than 50% by mass, the toughness-improving effect of the toughness modifier of the present invention tends to be lowered.

The amount of the other copolymerizable vinyl monomer is preferably not more than 50% by mass, and more preferably not more than 40% by mass, relative to the mass of the whole rubber elastic body.

A polyfunctional monomer may also be contained as a component forming the rubber elastic body to adjust the degree of crosslink. Examples of such polyfunctional monomers include divinylbenzene, butanediol di(meth)acrylate, triallyl (iso)cyanurate, allyl (meth)acrylate, diallyl itaconate, and diallyl phthalate. The amount of the polyfunctional monomer is preferably not more than 10% by mass, more preferably not more than 5% by mass, and still more preferably not more than 3% by mass, relative to the mass of the whole rubber elastic body. If the amount of the polyfunctional monomer exceeds 10% by mass, the toughness-improving effect of the toughness modifier of the present invention tends to be lowered.

A chain transfer agent may optionally be used to adjust the molecular weight and the degree of crosslink of the polymer forming the rubber elastic body. Examples of the chain transfer agents include $C_{5-20}$ alkylmercaptans. The amount of the chain transfer agent is preferably not more than 5% by mass, and more preferably not more than 3% by mass, relative to the mass of the whole rubber elastic body. If the amount of the chain transfer agent exceeds 5% by mass, the amount of uncrosslinked components in the rubber elastic body may be increased, which may adversely affect the properties, such as heat resistance and rigidity, of a cured product formed from a curable resin containing the toughness modifier of the present invention.

Moreover, a polysiloxane rubber elastic body may be used as the rubber polymer (A), instead of or in addition to the rubber elastic body. Examples of the polysiloxane rubber elastic body used as the rubber polymer (A) include polysiloxane rubbers containing silyloxy units di-substituted with alkyl or aryl groups, such as dimethylsilyloxy, methylphenylsilyloxy, and diphenylsilyloxy units. Furthermore, when such a polysiloxane rubber is used, it is more preferable to previously introduce a crosslinked structure into the polysiloxane rubber, for example, by using a polyfunctional alkoxysilane compound as a part of the components used in polymerization or by radical reaction with a silane compound containing a vinyl reactive group, according to need.

The rubber polymer (A) may be produced by a known emulsion polymerization method. The emulsifier to be used in an aqueous medium may preferably be an emulsifier that does not allow emulsion stability to be impaired in aqueous latex with a neutral pH. Specific examples thereof include alkali metal salts or ammonium salts of various acids, including alkyl- or aryl-sulfonic acids such as dioctyl sulfosuccinic acid and dodecylbenzenesulfonic acid; alkyl or aryl ether sulfonic acids; alkyl- or aryl-sulfuric acids such as dodecylsulfuric acid; alkyl or aryl ether sulfuric acids; alkyl- or aryl-substituted phosphoric acids; alkyl or aryl ether-substituted phosphoric acids; N-alkyl- or aryl-sarcosinic acids such as dodecylsarcosinic acid; alkyl- or aryl-carboxylic acids such as oleic acid and stearic acid; and alkyl or aryl ether carboxylic acids, as well as nonionic emulsifiers such as alkyl- or aryl-substituted polyethylene glycols. These may be used alone or in combinations of two or more.

For the purpose of preferred embodiments of the present invention, the amount of such an emulsifier to be used in the production of the rubber polymer (A) latex may more preferably be as little as possible, as long as dispersion stability is not impaired.

Known polymerization initiators, such as 2,2'-azobisisobutyronitrile, hydrogen peroxide, potassium persulfate, and ammonium persulfate, may be used as thermally decomposable initiators.

Redox initiators may also be used, including peroxides such as organic peroxides, e.g., t-butyl peroxy isopropyl carbonate, p-menthane hydroperoxide, cumene hydroperoxide, dicumyl peroxide, t-butyl hydroperoxide, di-t-butyl peroxide, and t-hexyl peroxide, and inorganic peroxides, e.g., hydrogen peroxide, potassium persulfate, and ammonium persulfate, optionally in combination with a reducing agent such as sodium formaldehyde sulfoxylate or glucose, and optionally a transition metal salt such as iron (II) sulfate, and optionally a chelating agent such as disodium ethylenediaminetetraacetate, and optionally a phosphorus-containing compound such as sodium pyrophosphate, and the like.

It is preferable to use a redox initiator because polymerization can be conducted even at such a low temperature that the peroxide is not substantially pyrolyzed, and thus a wide range of polymerization temperatures may be selected. It is particularly preferable to use an organic peroxide such as cumene hydroperoxide, dicumyl peroxide, or t-butyl hydroperoxide as the redox initiator. The amounts of the initiator and, in the case of using a redox initiator, the reducing agent, transition metal salt, chelating agent and the like may be selected as known in the art. When a monomer having two or more double bonds is polymerized, a known chain transfer agent may be used in the range known in the art. Further, an additional known surfactant may be used in the range known in the art.

The conditions for polymerization, including polymerization temperature, pressure, and the degree of deoxidization, may be appropriately selected as known in the art.

(Vinyl Monomer (B))

The vinyl monomer (B) used in the present invention may preferably be at least one selected from the group consisting of (meth)acrylate monomers, aromatic vinyl monomers, vinyl cyanide monomers, unsaturated acid derivatives, (meth)acrylic acid amide derivatives, and maleimide derivatives because they are available at low prices, and can provide both good graft polymerizability and compatibility with a curable resin.

Examples of the (meth)acrylate monomers include methyl (meth)acrylate, ethyl (meth)acrylate, and butyl (meth)acrylate, as well as (meth)acrylates having reactive side chain(s) such as hydroxyalkyl (meth)acrylates and epoxyalkyl (meth) acrylates (e.g. 2-hydroxyethyl (meth)acrylate and glycidyl (meth)acrylate).

Examples of the aromatic vinyl monomers include styrene and α-methylstyrene.

Examples of the vinyl cyanide monomers include (meth) acrylonitrile.

Examples of the unsaturated acid derivatives include α,β-unsaturated acids and α,β-unsaturated acid anhydrides, such as (meth)acrylic acid and maleic acid anhydride.

Examples of the (meth)acrylic acid amide derivatives include (meth)acrylamides (including N-substituted (meth) acrylamides).

Examples of the maleimide derivatives include maleimide.

These maybe used alone or in combinations of two or more.

In particular, when the shell part of the toughness modifier is required to have chemical reactivity during the curing of a curable resin, it is preferable to use at least one component selected from the monomer group consisting of the (meth) acrylates having reactive side chain(s), (meth)acrylamides (including N-substituted (meth)acrylamides), α,β-unsaturated acids, α,β-unsaturated acid anhydrides, maleimide derivatives, and epoxyalkyl vinyl ethers (e.g. glycidyl vinyl ether).

The vinyl monomer (B1) and the vinyl monomer (B2) to be used for producing the trilaminar toughness modifier may also be selected from the aforementioned compounds usable as the vinyl monomer (B).

Styrene is preferred among them as the vinyl monomer (B1) in terms of preventing impregnation of the vinyl monomer (B2) into the rubber polymer layer, and of compatibility with a curable resin. Moreover, styrene, methyl methacrylate, acrylonitrile, and glycidyl methacrylate are preferred as the vinyl monomer (B2) in view of good graft polymerizability and compatibility with a curable resin.

The ratio of parts (by mass) of rubber polymer (A)/vinyl monomer (B) in polymerization preferably ranges from 50/50 to 95/5, and more preferably from 60/40 to 90/10. If the proportion of (A) is reduced so that the polymerization ratio of (A)/(B) is away from 50/50, the toughness-improving effect tends to be lowered. If the proportion of (B) is reduced so that the ratio is away from 95/5, dispersibility in a curable resin may be lowered, possibly failing to result in desired physical properties.

When a trilaminar toughness modifier is produced, the mass ratio of (rubber polymer (A))/(total of vinyl monomer (B1) and vinyl monomer (B2)) preferably falls within the range mentioned above.

The (mass) ratio of (vinyl monomer (B1) for forming an intermediate coating layer)/(vinyl monomer (B2) for forming an outermost layer) in polymerization is preferably 10/90 to 90/10, and more preferably 30/70 to 80/20. If the proportion of (B1) is reduced so that the polymerization ratio is away from 10/90, it may result in a small contribution to enhancing dispersibility. If the proportion of (B2) is reduced so that the polymerization ratio is away from 90/10, the toughness-improving effect may not be provided.

(Nonionic Reactive Surfactant (C))

The toughness modifier for a curable resin of the present invention is obtained by emulsion-polymerizing, in the presence of the rubber polymer (A) latex, the vinyl monomer (B) using a nonionic reactive surfactant. Accordingly, the toughness modifier can exhibit desired dispersibility and toughness-improving effect in curable resins, curable resin compositions containing a curable resin and a thermoplastic resin, and cured products formed therefrom.

Examples of the nonionic reactive surfactant used in the present invention include ester type, ether type, and ester ether type nonionic surfactants containing a radically polymerizable unsaturated group such as acryloyl, methacryloyl, and alkenyl groups. Preferred among these are polyoxyalkylene alkenyl ethers, particularly preferably nonionic reactive surfactants represented by the following formula (1), in terms of polymerization stability and stability against hydrolysis.

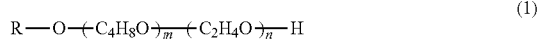

(1)

In the formula, R represents a terminal double bond-containing alkenyl group; m denotes a number from 2 to 50; and n denotes a number from 2 to 100.

The symbol m is preferably a number from 2 to 40, and more preferably from 2 to 30. The symbol n is preferably a number from 5 to 80, and more preferably from 10 to 70.

In the formula (1), m units of —$C_4H_8O$— and n units of —$C_2H_4O$— may be located at any position in the main chain. In other words, the sequence of the —$C_4H_8O$— units and the —$C_2H_4O$— units in the main chain of the formula (1) is not particularly limited. The polymer main chain may be formed of a block copolymer, a random copolymer, or a random copolymer containing a block copolymer portion.

The lower limit of the amount of the nonionic reactive surfactant, when expressed relative to 100 parts by mass of a total of the rubber polymer (A) and the vinyl monomer (B), is 0.5 parts by mass, more preferably 1 part by mass, and still more preferably 1.5 parts by weight. If the amount of the nonionic reactive surfactant is less than 0.5 parts by mass, the effect of stabilizing the dispersion in a curable resin containing a thermoplastic resin may not be obtained. Moreover, the upper limit of the amount of the nonionic reactive surfactant is 15 parts by mass, more preferably 13 parts by mass, and still more preferably 11 parts by weight. If the amount of the nonionic reactive surfactant exceeds 15 parts by mass, then the amount of unreacted surfactant may be increased, which may adversely affect the mechanical properties and wet heat resistance of a curable resin composition.

(Monomer (E) Having at Least Two Radically Polymerizable Groups)

Examples of the monomer (E) having at least two radically polymerizable groups, which is used for producing the trilaminar toughness modifier, include allyl (meth)acrylate, ethylene glycol di(meth)acrylate, diethylene glycol di(meth)acrylate, triethylene glycol di(meth)acrylate, tetraethylene glycol di(meth)acrylate, butanediol di(meth)acrylate, triallyl (iso)cyanurate, diallyl phthalate, divinylbenzene, and diallyl itaconate. Allyl methacrylate and triallyl isocyanurate are preferred among them from the viewpoint of polymerizability and availability. These may be used alone or in combinations of two or more.

The lower limit of the amount of the monomer (E) having at least two radically polymerizable groups, when expressed relative to 100 parts by mass of the vinyl monomer (B1), is preferably 0.1 parts by mass, more preferably 0.3 parts by mass, and particularly preferably 0.5 parts by mass. The upper limit thereof is preferably 10 parts by mass, more preferably 8 parts by mass, and particularly preferably 5 parts by mass. If the amount of the monomer (E) is less than 0.1 parts by mass, the effect of improving dispersibility in a curable resin and in a curable resin containing a thermoplastic resin, which will be mentioned later, may not be produced. If the amount of the monomer (E) exceeds 10 parts by mass, the toughness-improving effect may be reduced.

(Method of Producing Toughness Modifier)

The toughness modifier of the present invention may be produced by a known emulsion polymerization method.

Emulsion polymerization of the vinyl monomer (B) in the rubber polymer (A) latex may be performed by a known emulsion polymerization method, provided that the nonionic reactive surfactant (C) is used as a surfactant as described above. Specifically, a polymerization method similar to the method for producing the rubber polymer (A) may be employed.

The polymerization may be performed in one step or multiple steps. Examples of the polymerization methods include a method of adding the vinyl monomer (B) to the rubber polymer (A) latex at once or continuously; and a method of introducing the rubber polymer (A) latex into a reactor containing the vinyl monomer (B), followed by polymerization.

The trilaminar toughness modifier may be produced as described above, provided that an additional step of forming an intermediate coating layer is included. For example, the trilaminar toughness modifier may be produced by a method including polymerizing, in the presence of the rubber polymer (A) latex, the vinyl monomer (B1) and the monomer (E) having at least two radically polymerizable groups per molecule to form an intermediate coating layer, and then emulsion-polymerizing the vinyl monomer (B2) using the nonionic reactive surfactant (C) to form an outermost layer.

(Curable Resin Composition)

The curable resin composition of the present invention contains 20 to 99.5% by mass of a curable resin (D) and 0.5 to 80% by mass of the toughness modifier of the present invention.

The toughness modifier in an amount less than 0.5% by mass disadvantageously cannot sufficiently modify toughness, whereas the toughness modifier in an amount exceeding 80% by mass disadvantageously can cause the curable resin composition to become too soft. The amount of the toughness modifier is preferably not less than 0.7% by mass, and more preferably not less than 1.0% by mass. Also, the amount of the toughness modifier is preferably not more than 45% by mass, and more preferably not more than 40% by mass.

(Curable Resin (D))

The curable resin (D) used in the present invention is not particularly limited and may be a thermosetting resin or a photocurable (or electron beam curable) resin. Examples thereof include reactive polymers (or monomers) containing double bond(s), methylol, cyclic ether, or cyanato group(s), or the like.

Examples of the reactive polymers (or monomers) containing double bond(s) include unsaturated polyester resins, vinyl ester resins, and acrylate resins. Examples of the reactive polymers (or monomers) containing methylol group(s) include phenolic resins. Examples of the reactive polymers (or monomers) containing cyclic ether group (s) include epoxy resins and oxetane resins. Examples of the reactive monomers containing cyanato group(s) include cyanate resins. These curable resins may be used alone or in combinations of two or more.

Unsaturated polyester resins, vinyl ester resins, acrylate resins, phenolic resins, epoxy resins, and cyanate resins, among the aforementioned curable resins (D), are categorized into thermosetting resins. Meanwhile, epoxy resins, oxetane resins, and acrylate resins are categorized into photocurable (or electron beam curable) resins.

Additionally, a thermoplastic resin (F), which will be mentioned below, may be mixed with or melted in the curable resin.

(Thermoplastic Resin (F))

The curable resin composition may preferably further contain a thermoplastic resin (F). The resin component of the curable resin composition may suitably be a mixture or a melt of the curable resin and the thermoplastic resin for the purpose of imparting toughness to the curable resin composition.

Examples of the thermoplastic resin (F) include acrylic polymers, polystyrene resins, polycarbonate, polyarylate, polyamide, polyamide-imide, polysulfone, polyether sulfone, polyphenylsulfone, polyether ketone, polyphenylene sulfide, polyetherimide, polyesterimide, (modified) polyphenylene oxides, phenolic hydroxyl group-containing resins, phenoxy resins, and novolac resins. The term "phenoxy resins" is used as a generic term for polymers having a main chain formed by polyaddition of an aromatic diol with an aromatic diglycidyl ether. "Novolac resins" refer to polycondensates of phenols, and examples thereof include phenol novolac resin, bisphenol novolac resin, and cresol novolac resin. In particular, the thermoplastic resin (F) may preferably be at least one selected from the group consisting of polyether sulfone, polyetherimide, phenoxy resins, and novolac resins, in view of their heat resistance and compatibility with a curable resin.

The amount of the thermoplastic resin (F) relative to 100 parts by mass of the curable resin is preferably not less than 2 parts by mass, and more preferably not less than 5 parts by mass, whereas it is preferably not more than 50 parts by mass, and more preferably not more than 30 parts by mass. If the amount of the thermoplastic resin (F) is less than 2 parts by mass, the effect of improving toughness may not be expected. If the amount of the thermoplastic resin (F) exceeds 50 parts by mass, the viscosity of the composition may be increased so that it may be difficult to handle.

(Method of Preparing Curable Resin Composition)

The curable resin composition of the present invention may be prepared by the method described in WO 2005/28546.

Specifically, the curable resin composition may preferably be prepared by a method including the steps of:
- a first step of mixing an aqueous latex containing the toughness modifier (specifically, a reaction mixture resulting from the production of the toughness modifier by emulsion polymerization) with an organic solvent having a solubility in water at 20° C. of 5 to 40% by mass, and then with excess water to allow the toughness modifier to loosely aggregate;
- a second step of separating and recovering the loose aggregates of the toughness modifier from the liquid phase, and then mixing the recovered toughness modifier with an organic solvent again to prepare a dispersion of the toughness modifier in the organic solvent; and
- a third step of further mixing the dispersion in the organic solvent with the curable resin (D), and then distilling off the organic solvent.

(First Step: Preparation of Loose Aggregates of Toughness Modifier)

The first step involves mixing an aqueous latex with an organic solvent preferably having a solubility in water at 20° C. of at least 5% by mass but not higher than 40% by mass (more preferably not higher than 30% by mass). The use of such an organic solvent causes phase separation (described later) when water is further added to the mixture after this mixing operation. Such phase separation allows the toughness modifier to aggregate so loosely that the resulting aggregates can be redispersed.

If the solubility of the organic solvent is lower than 5% by mass, it may be slightly difficult to mix the organic solvent with the dispersion containing the toughness modifier in an aqueous medium. If the solubility is higher than 40% by mass, it may be difficult to separate and recover the toughness modifier from the liquid phase (mainly the aqueous phase) in the second step (described later).

Examples of the organic solvents having a solubility in water at 20° C. of at least 5% by mass but not higher than 40% by mass include ketones (e.g. methyl ethyl ketone), esters (e.g. methyl formate, methyl acetate, and ethyl acetate), ethers (e.g. diethyl ether, ethylene glycol diethyl ether, and tetrahydropyran), acetals (e.g. methylal), and alcohols (e.g. n-butyl alcohol, isobutyl alcohol, and sec-butyl alcohol). These organic solvents may be used alone or in combinations of two or more.

The organic solvent to be used in the first step may be a mixed organic solvent as long as the mixture of solvents as a whole has a solubility in water at 20° C. of at least 5% by mass but not higher than 40% by mass. Examples thereof include appropriate combinations of two or more organic solvents, including at least one of poorly water-soluble organic solvents and at least one of highly water-soluble organic solvents. Examples of the poorly water-soluble organic solvents include ketones (e.g. methyl propyl ketone, diethyl ketone, methyl isobutyl ketone, and ethyl butyl ketone), esters (e.g. diethyl carbonate, butyl formate, propyl acetate, and butyl acetate), ethers (e.g. diisopropyl ether and dibutyl ether), aliphatic hydrocarbons (e.g. pentane, hexane, heptane, and octane), aromatic hydrocarbons (e.g. benzene, toluene, and xylene), and halogenated hydrocarbons (e.g. methylene chloride and chloroform). Examples of the highly water-soluble organic solvents include ketones (e.g. acetone and cyclohexanone), esters (e.g. γ-valerolactone and ethylene glycol monomethyl ether acetate), ethers (e.g. dioxane and ethylene glycol monomethyl ether), alcohols (e.g. ethanol, isopropyl alcohol, and t-butyl alcohol), and tetrahydrofuran.

Moreover, for the purpose of easy removal of the liquid phase (mainly the aqueous phase) in the second step described below, the organic solvent to be used in the first step may preferably have a specific gravity lower than water.

The amount of the organic solvent to be mixed with the aqueous latex is preferably at least 50 parts by mass, more preferably at least 60 parts by mass, but preferably not more than 300 parts by weight, more preferably not more than 250 parts by mass, and still more preferably not more than 150 parts by mass, relative to 100 parts by mass of the aqueous latex. If the amount of the organic solvent is less than 50 parts by mass, the toughness modifier contained in the aqueous latex may be unlikely to form aggregates. Also, if the amount of the organic solvent is more than 300 parts by mass, more water may be required in the subsequent operation for forming loose aggregates of the toughness modifier, which may lead to a lowering of production efficiency.

The aqueous latex and the organic solvent may be mixed in a known manner. For example, a common device such as a stirring vessel with a stirring blade may be used, or a static mixer, a line mixer (a system having a built-in stirrer at a part of a pipeline) or the like may be used.

The first step involves, after the operation of mixing the aqueous latex with the organic solvent, further adding excess water to the mixture and mixing them. This causes phase separation, allowing the toughness modifier to loosely aggregate. This, at the same time, allows most of the electrolytic substances, such as a water-soluble emulsifier or dispersant, a water-soluble polymerization initiator, and a reducing agent, which are used in the preparation of the aqueous latex, to be extracted into the aqueous phase.

The water may preferably be mixed in an amount of at least 40 parts by mass, more preferably at least 60 parts by mass, but preferably not more than 1000 parts by mass, and more preferably not more than 700 parts by mass, relative to 100 parts by mass of the organic solvent used for mixing with the aqueous latex. If the amount of water to be mixed is less than 40 parts by mass, it may be difficult to obtain the toughness modifier as loose aggregates. Also, if the amount of water exceeds 1000 parts by mass, the organic solvent concentration in the aggregated toughness modifiers is decreased, and thus the dispersibility of the toughness modifier may be reduced such that, for example, the time period required for redispersing the aggregated toughness modifiers is prolonged in the second step described below.

(Second Step: Preparation of Dispersion of Toughness Modifier in Organic Solvent)

The second step involves separating and recovering the loose aggregates of the toughness modifier from the liquid phase to prepare a toughness modifier dope. This operation allows separation and removal of water-soluble impurities such as an emulsifier from the toughness modifier.

As the method for separating and recovering the loose aggregates of the toughness modifier from the liquid phase, for example, the following methods may be mentioned: in the case of using a stirring vessel in the first step, a method including discharging the liquid phase (mainly the aqueous phase) from the bottom of the stirring vessel because the aggregated toughness modifiers generally float in the liquid phase; and a method including filtration through filter paper, filter fabric, or a relatively coarse metal screen.

The amount of organic solvent contained in the loose aggregates of the toughness modifier (toughness modifier dope) is preferably not less than 30% by mass, and more preferably not less than 35% by mass of the mass of the entire loose aggregates. The amount is also preferably not more than 95% by mass, and more preferably not more than 90% by mass. If the amount of organic solvent is less than 30% by mass, some problems may be caused, for example, the time period required for redispersing the toughness modifier dope in an organic solvent (as described below) may be prolonged, or irreversible aggregates may be likely to remain. Also, if the amount of organic solvent exceeds 95% by mass, the toughness modifier may be allowed to aggregate in the third step since a large amount of water should be dissolved and remain in such a solvent.

The amount of organic solvent in the aggregates of the toughness modifier can be determined by precisely weighing the aggregates of the toughness modifier, drying them at 120° C. for 15 minutes, and then determining the weight loss as the amount of organic solvent contained in the aggregates.

The second step further involves mixing the aggregates of the toughness modifier (toughness modifier dope) with an organic solvent. The toughness modifiers are loosely aggregated, and therefore can be easily redispersed as primary particles in the organic solvent by mixing with the organic solvent.

Examples of the organic solvent to be used in the second step include those mentioned above as organic solvents usable in the first step. The use of such an organic solvent makes it possible to remove water present in the toughness modifier by distilling off the organic solvent azeotropically with water in the third step described below. The organic solvent to be used in the second step may be the same as or different from the organic solvent used in the first step.

The amount of the organic solvent to be used in the second step, when expressed relative to 100 parts by mass of the aggregates of the toughness modifier, is preferably not less than 40 parts by mass, and more preferably not less than 200 parts by mass. The amount is also preferably not more than 1400 parts by mass, and more preferably not more than 1000 parts by mass. If the amount of the organic solvent is less than 40 parts by mass, it may be difficult to uniformly disperse the toughness modifier in the organic solvent; therefore, a mass of aggregated toughness modifiers may remain, or the mixture may become too viscous to handle easily. Also, if the amount of the organic solvent exceeds 1400 parts by mass, a large amount of energy and large equipment will be uneconomically required to evaporate and remove organic solvents in the third step described below.

It is preferable to one or more times performing, between the first step and the second step, the step of separating and recovering the aggregates of the toughness modifier from the liquid phase, and again mixing the recovered toughness modifier with an organic solvent having a solubility in water at 20° C. of at least 5% by mass but not higher than 40% by mass, and then with excess water to allow the toughness modifier to loosely aggregate. This further reduces the residual amount of water-soluble impurities such as an emulsifier contained in the toughness modifier dope.

(Third Step: Preparation of Toughness Modifier Dispersion Composition)

The third step involves replacing the organic solvent in the organic solvent solution (or organic solvent dispersion) of the toughness modifier obtained in the second step with the curable resin. This operation provides a toughness modifier dispersion composition in which the toughness modifier is dispersed as primary particles. This operation, at the same time, allows the water remaining in the aggregates of the toughness modifier to be azeotropically distilled off.

The amount of the curable resin to be used in the third step may be appropriately adjusted according to the desired final concentration of the toughness modifier in the toughness modifier dispersion composition.

Moreover, the organic solvent may be distilled off by a known method. Examples of such methods include a method of charging a mixture of the organic solvent solution (dispersion) and the curable resin in a vessel, and heating and evaporating the mixture under reduced pressure; a method of bringing the mixture into contact with a dry gas in a counterflow manner in a vessel; a continuous method using a thin film type evaporator or the like; and a method using an extruder or continuous stirring vessel equipped with an evaporation means. The conditions for distilling off the organic solvent, such as the temperature and required period of time, can be appropriately selected within ranges that do not impair the quality of the resulting toughness modifier dispersion composition. Moreover, the amount of volatile matter remaining in the toughness modifier dispersion composition may be appropriately selected within an acceptable range for an intended application of the toughness modifier dispersion composition.

When the resin component is a mixture or a melt of the curable resin and the thermoplastic resin (F), a curable resin composition containing the curable resin, the toughness modifier, and the thermoplastic resin (F) can be prepared, according to the method for preparing the curable resin composition as mentioned above, by preparing a curable resin composition containing the toughness modifier, then adding the thermoplastic resin (F), and mixing the mixture, optionally under heating, or alternatively by adding and mixing into the curable resin composition a mixture or a melt separately prepared by mixing a curable resin and the thermoplastic resin (F) under heating. When mixing is performed in the latter way, the curable resin to be mixed with the thermoplastic resin may be the same as or different from the curable resin in which the toughness modifier is to be dispersed. Moreover, the thermoplastic resin (F) may preferably be compatibilized with the curable resin.

(Additives)

The curable resin composition of the present invention may optionally incorporate additives such as organic peroxides, curing accelerators, chain transfer agents, photosensitizers, reducing agents, plasticizers, fillers, adhesion promoters (including primers), dyes, pigments, stabilizers, ultraviolet absorbers, diluents (reactive/non-reactive), and organic solvents.

(Cured Product)

The cured product of the present invention is formed by curing the curable resin composition of the present invention. The method for curing the curable resin composition may be appropriately selected depending on the type of curable resin (D).

When the curable resin composition of the present invention is thermally cured, a curing agent may be added in the curable resin composition. Examples of the curing agents include amine curing agents (e.g. aliphatic diamines and aromatic diamines), acid anhydrides (e.g. hexahydrophthalic anhydride), novolac type phenolic resins, imidazole compounds, tertiary amines, triphenylphosphine, aliphatic polyamines, aromatic polyamines, polyamides, polymercaptans, dicyandiamides, dibasic acid dihydrazides, N,N'-dialkylurea derivatives, N,N'-dialkylthiourea derivatives, alkylaminophenol derivatives, melamine, and guanamine. These curing agents may be used alone or in combinations of two or more.

When the curable resin composition of the present invention is photo-cured, a photopolymerization initiator may be added in the curable resin composition. Examples of the photopolymerization initiators include photo-radical polymerization initiators such as benzophenone, benzoin methyl ether, methyl-O-benzoyl benzoate, benzyl dimethyl ketal, 1-hydroxycyclohexyl phenyl ketone, 2-hydroxy-2-methyl-1-phenylpropanone, 2-methyl-1-[4-(methylthio)phenyl]-2-morpholino-1-propanone, 2,4-diethylthioxanthone, and diphenyl(2,4,6-trimethylbenzoyl)phosphine oxide; and photocationic polymerization initiators (photo-acid generating agents), including onium salts, such as aromatic sulfonium or iodonium salts, with anions such as hexafluoroantimonate, hexafluorophosphate or tetraphenylborate, and metallocene salts. These photopolymerization initiators may be used alone or in combinations of two or more.

(Degree of Dispersion of Toughness Modifier)

The toughness modifier may preferably be dispersed as primary particles in the matrix (resin) of a cured product formed by curing the curable resin composition of the present invention. Herein, the phrase the toughness modifier is "dispersed as primary particles" means that particles of the toughness modifier are not aggregated with one another but are each independently dispersed in the matrix. Specifically, it means that the proportion of dispersed particles is not lower than 50%. The proportion of dispersed particles (%) is calculated using the Equation 1 below as mentioned later. The proportion of dispersed particles is preferably not lower than 70%, more preferably not lower than 75%, and still more preferably not lower than 90%, from the viewpoint of improving toughness as mentioned above.

$$\text{Proportion of dispersed particles}(\%) = (1 - (B_1/B_0)) \times 100 \quad \text{(Equation 1)}$$

Thus, the sum $B_0$ of the number of single polymer fine particles and the number of aggregates each including at least two polymer fine particles in contact with each other, and the number $B_1$ of aggregates each including at least two polymer fine particles in contact with each other, in a measurement sample are determined. Then, a proportion of dispersed particles is calculated according to the Equation 1. Here, samples and observation areas should be selected so that the sum $B_0$ be at least 10.

(Applications)

The curable resin composition of the present invention can suitably be used for molding materials, adhesives, fiber or filler reinforced composite materials, sealing materials, casting materials, insulating materials, coating materials, filling materials, stereolithography (or optical fabrication) materials, optical components, inks, and toners.

The curable resin composition may be formed by a method such as, but not limited to, transfer molding, cast molding, baking finishing, rotational molding, and stereolithography (or optical fabrication), as well as hand lay-up molding in which carbon fiber, glass fiber or the like is combined, prepreg molding, pultrusion, filament winding, press molding, resin transfer molding (RTM, VaRTM), and SMC molding.

EXAMPLES

The present invention is described in greater detail below, referring to non-limiting specific examples.

The raw materials used in the preparation examples, examples, and comparative examples are listed below.

[Dispersion A1-1 of Toughness Modifier in Curable Resin]
A dispersion prepared through the synthesis in Preparation Example 6 was used as the dispersion A1-1 of a toughness modifier in a curable resin.

[Dispersion A1-2 of Toughness Modifier in Curable Resin]
A dispersion prepared through the synthesis in Preparation Example 6 was used as the dispersion A1-2 of a toughness modifier in a curable resin.

[Dispersion A2-1 of Toughness Modifier in Curable Resin]
A dispersion prepared through the synthesis in Preparation Example 7 was used as the dispersion A2-1 of a toughness modifier in a curable resin.

[Dispersion A2-2 of Toughness Modifier in Curable Resin]
A dispersion prepared through the synthesis in Preparation Example 7 was used as the dispersion A2-2 of a toughness modifier in a curable resin.

[Dispersion A3-1 of Toughness Modifier in Curable Resin]
A dispersion prepared through the synthesis in Preparation Example 6 was used as the dispersion A3-1 of a toughness modifier in a curable resin.

[Dispersion A3-2 of Toughness Modifier in Curable Resin]
A dispersion prepared through the synthesis in Preparation Example 6 was used as the dispersion A3-2 of a toughness modifier in a curable resin.

[Dispersion A4-1 of Toughness Modifier in Curable Resin]
A dispersion prepared through the synthesis in Preparation Example 7 was used as the dispersion A4-1 of a toughness modifier in a curable resin.

[Dispersion A4-2 of Toughness Modifier in Curable Resin]
A dispersion prepared through the synthesis in Preparation Example 7 was used as the dispersion A4-2 of a toughness modifier in a curable resin.

[Curable Resin B1]
As the curable resin B1, N,N,N',N'-tetraglycidyldiaminodiphenylmethane (Huntsman Japan KK, trade name: ARALDITE MY 721 CH) was used.

[Curable Resin B2]
As the curable resin B2, a liquid bisphenol A type epoxy resin (Mitsubishi Chemical Corporation, trade name: jER 828EL) was used.

[Curing Agent C1]
As the curing agent C1, a modified aromatic amine (Mitsubishi Chemical Corporation, trade name: jER Cure W) was used.

[Curing Agent C2]
As the curing agent C2, 4,4-diaminodiphenylsulfone (Huntsman Japan KK, trade name: Aradur 9446-1) was used.

[Thermoplastic Resin D1]
As the thermoplastic resin D1, a polyethersulfone resin (Sumitomo Chemical Co., Ltd., SUMIKAEXCEL PES 5003P) was used.

[Nonionic Reactive Surfactant E1]
As the nonionic reactive surfactant E1, a polyoxyalkylene alkenyl ether (KAO Corporation, LATEMUL PD450) was used.

(Evaluation Methods)
Evaluation methods in the examples and preparation examples are shown below.

(Degree of Dispersion of Particles)
A test piece, which had been used in the below-mentioned measurement of flexural moduli, was freeze-fractured in liquid nitrogen. A freeze-fractured surface of the test piece was observed using a scanning electron microscope (JEOL Ltd., JSM-6300F) at a magnification of 20,000×. Then, a proportion of dispersed particles (%) was calculated as mentioned below, and used as an indicator to determine the degree of dispersion.

Good: The proportion of dispersed particles is not lower than 70%.

Poor: The proportion of dispersed particles is lower than 70%.

(Proportion of Dispersed Particles)
In a scanning electron micrograph obtained at a magnification of 20,000×, four areas five centimeters square were randomly chosen. The proportions of dispersed particles (%) in the areas were calculated according to the method mentioned earlier, and the average of these was used.

(Particle Size of Toughness Modifier)
The volume average particle size was measured with a particle size analyzer (NIKKISO CO., LTD., Microtrac UPA).

(Measurement of Flexural Modulus)
A test piece (length: 100 mm, width (b): 10 mm, thickness (h): 5 mm) was cut out from a cured sample sheet, and aged at 23° C. Then, the sample was tested by a three-point bending test using an autograph, AG-2000E (Shimadzu Corporation) at a span (L) of 80 mm and a testing speed of 2 mm/min. The initial slope (F/e) of a load (F)-deflection (e) curve thus obtained was determined, and a flexural modulus (E) was calculated using the following Equation 2. In the equation, (F/e) is given in kN/mm, and L, b and h are given in millimeters.

$$E(\text{GPa}) = L^3 \times (F/e)/(4 \times b \times h^3) \quad \text{(Equation 2)}$$

(Measurement of Fracture Toughness)
A test piece (length: 2.5 in., width (b): 0.5 in., thickness (h): 5 mm) was cut out from a cured sample sheet, and a V-shaped notch was formed on the test piece using a notching machine. Then, a crack extending from the tip of the V-shaped notch to the center of the test piece was formed with a razor blade. The test piece was aged at 23° C., and tested by a three-point bending test using an autograph, AG-2000E (Shimadzu Corporation) at a span (L) of 50 mm and a testing speed of 1 mm/min. A fracture toughness Kic (MPa·m$^{1/2}$) was calculated using the maximum strength F (kN) determined by the bending test, according to the following Equations 3 and 4. In the equations, "a" represents a sum of the depth of the V-shaped notch and the distance from the tip of the V-shaped notch to the crack front, and L, h, a, and b are given in centimeters.

$$K1c = (F \times L/(h \times b^{3/2})) \times f \quad \text{(Equation 3)}$$

$$f = 3(a/b)^{1/2} \times AA/BB$$

$$AA = 1.99 - (a/b)\{1 - (a/b)\}\{2.15 - 3.93(a/b) + 2.7(a/b)^2\}$$

$$BB = 2\{1 + 2(a/b)\}\{1 - (a/b)\}^{3/2} \quad \text{(Equation 4)}$$

Preparation Example 1

Polybutadiene Rubber Polymer Latex (R-1)

A pressure-resistant polymerizer was charged with 200 parts by mass of deionized water, 0.03 parts by mass of tripotassium phosphate, 0.25 parts by mass of potassium dihydrogen phosphate, 0.002 parts by mass of disodium ethylenediaminetetraacetate ("EDTA"), 0.001 parts by mass of iron (II) sulfate heptahydrate ("Fe"), and 1.5 parts by mass of sodium dodecylbenzenesulfonate ("SDS"), and the mixture was sufficiently purged with nitrogen under stirring to remove oxygen. Thereafter, 100 parts by mass of butadiene ("BD") was introduced into the system, and the contents were heated to 45° C. To the polymerizer were added 0.015 parts by mass of p-menthane hydroperoxide ("PHP") and then 0.04 parts by mass of sodium formaldehyde sulfoxylate ("SFS") to initiate polymerization. Four hours after the polymerization initiation, 0.01 parts by mass of PHP, 0.0015 parts by mass of EDTA, and 0.001 parts by mass of Fe were introduced. After ten hours of polymerization, residual monomers were removed by devolatilization under reduced pressure to terminate the polymerization. Thus, a latex (R-1) containing polybutadiene rubber particles was obtained. The polybutadiene rubber particles contained in the obtained latex had a volume average particle size of 0.08 µm.

Preparation Example 2

Polymerization of Toughness Modifier (L-1)

A glass reactor equipped with a thermometer, a stirrer, a reflux condenser, a nitrogen flow-inlet, and a monomer feeder was charged with 210 parts by mass of the polybutadiene rubber polymer latex (R-1) (including 70 parts by mass of the rubber polymer component) and 230 parts by mass of deionized water and the mixture was stirred at 60° C. while being purged with nitrogen. Then, 0.004 parts by mass of EDTA, 0.001 parts by mass of iron (II) sulfate heptahydrate, and 0.2 parts by mass of SFS were added, and then 9 parts by mass of the nonionic reactive surfactant (E1) was added, followed by stirring for 30 minutes. Then, a mixture of 14 parts by mass of styrene ("St"), 9 parts by mass of acrylonitrile ("AN"), 4 parts by mass of methyl methacrylate ("MMA"), 3 parts by mass of glycidyl methacrylate ("GMA"), and 0.08 parts by mass of cumene hydroperoxide ("CHP") was continuously added over 200 minutes. After the completion of addition, 0.04 parts by mass of CHP was added, and the mixture was further stirred for one hour to complete the polymerization. In this manner, an aqueous latex (L-1) containing a toughness modifier was obtained. The polymerization conversion rate of the monomer component was not lower than 99%. The toughness modifier in the obtained aqueous latex had a volume average particle size of 0.12 µm.

Preparation Example 3

Polymerization of Toughness Modifier (L-2)

An aqueous latex (L-2) containing a toughness modifier was obtained in the same polymerization manner as in Preparation Example 2, except that the nonionic reactive surfactant (E1) was not added. The polymerization conversion rate of the monomer component was not lower than 99%. The polymer fine particles in the obtained aqueous latex had a volume average particle size of 0.11 µm.

Preparation Example 4

Polymerization of Trilaminar Toughness Modifier (L-3)

A glass reactor equipped with a thermometer, a stirrer, a reflux condenser, a nitrogen flow-inlet, and a monomer feeder was charged with 180 parts by mass of the polybutadiene rubber polymer latex (R-1) (including 60 parts by mass of the rubber polymer component) and 230 parts by mass of deionized water and the mixture was stirred at 60° C. while being purged with nitrogen. Then, 0.004 parts by mass of EDTA, 0.001 parts by mass of iron (II) sulfate heptahydrate, and 0.2 parts by mass of SFS were added, and then 23 parts by mass of St and 1.15 parts by mass of allyl methacrylate were continuously added over 160 minutes, followed by further stirring for one hour. Then, 5 parts by mass of the nonionic reactive surfactant (E1) was added and the mixture was stirred for 30 minutes. Thereafter, a mixture of 7 parts by mass of St, 5 parts by mass of AN, 2 parts by mass of MMA, 3 parts by mass of GMA, and 0.08 parts by mass of CHP was continuously added over 200 minutes. After the completion of addition, 0.04 parts by mass of CHP was added and the mixture was further stirred for one hour to complete the polymerization. In this manner, an aqueous latex (L-3) containing a toughness modifier was obtained. The polymerization conversion rate of the monomer component was not lower than 99%. The toughness modifier in the obtained aqueous latex had a volume average particle size of 0.10 µm.

Preparation Example 5

Polymerization of Trilaminar Toughness Modifier (L-4)

An aqueous latex (L-4) containing a toughness modifier was obtained in the same polymerization manner as in Preparation Example 4, except that the nonionic reactive surfactant (E1) was not added. The polymerization conversion rate of the monomer component was not lower than 99%. The polymer fine particles in the obtained aqueous latex had a volume average particle size of 0.09 µm.

Preparation Example 6

Production of Dispersions A1-1, a1-2, A3-1 and A3-2 of Toughness Modifier in Curable Resin A 1-L mixing vessel was charged with 126 parts by mass of isobutanol at 30° C., and then 126 parts by mass of the aqueous latex (L-1) of a toughness modifier obtained in Preparation Example 2 was added to the vessel under stirring. After uniform mixing, 650 parts by mass of water was introduced at a feed rate of 80 parts by mass per minute. After the completion of feeding, stirring was stopped immediately. Thus, a slurry containing floating aggregates was obtained. Subsequently, 710 parts by mass of the liquid phase was discharged through an outlet at the bottom of the vessel while leaving the aggregates in the vessel. Then, 400 parts by mass of methyl ethyl ketone ("MEK") was added to and mixed with the aggregates to give a dispersion of a toughness modifier in an organic solvent. Then, the curable resin (B1) was added to and mixed with the dispersion in an organic solvent such that the ratio of (toughness modifier)/(curable resin) was 25/75, followed by distilling off the organic solvent under reduced pressure to obtain a dispersion A1-1 of a toughness modifier dispersed in the curable resin (B1). Separately, a dispersion A1-2 of a toughness modifier dispersed in the curable resin (B2) was obtained in the same manner, but using the curable resin (B2).

A dispersion A3-1 of a toughness modifier dispersed in the curable resin (B1) and a dispersion A3-2 of a toughness modifier dispersed in the curable resin (B2) were obtained in the same manner, but using the aqueous latex (L-3) of a toughness modifier obtained in Preparation Example 4.

Preparation Example 7

Production of Dispersions A2-1, A2-2, A4-1 and A4-2 of Toughness Modifier in Curable Resin A 1-L mixing vessel was charged with 126 parts by mass of MEK at 30° C., and then 126 parts by mass of the aqueous latex (L-2) of a toughness modifier obtained in Preparation Example 3 was added to the vessel under stirring. After uniform mixing, 200 parts by mass of water was introduced at a feed rate of 80 parts by mass per minute. After the completion of feeding, stirring was stopped immediately. Thus, a slurry containing floating aggregates was obtained. Subsequently, 350 parts by mass of the liquid phase was discharged through an outlet at the bottom of the vessel while leaving the aggregates in the vessel. Then, 150 parts by mass of MEK was added to and mixed with the aggregates to give a dispersion of a toughness modifier dispersed in an organic solvent. Then, the curable resin (B1) was added to and mixed with the dispersion in an organic solvent such that the ratio of (toughness modifier)/(curable resin) was 25/75, followed by distilling off the organic solvent under reduced pressure to obtain a dispersion A2-1 of a toughness modifier dispersed in the curable resin (B1). Separately, a dispersion A2-2 of a toughness modifier dispersed in the curable resin (B2) was obtained in the same manner, but using the curable resin (B2).

A dispersion A4-1 of a toughness modifier dispersed in the curable resin (B1) and a dispersion A4-2 of a toughness modifier dispersed in the curable resin (B2) were obtained in the same manner, but using the aqueous latex (L-4) of a toughness modifier obtained in Preparation Example 5.

Table 1 summarizes the details for the dispersions of a toughness modifier in a curable resin obtained in Preparation Examples 6 and 7.

TABLE 1

| Dispersion of toughness modifier in curable resin | A1-1 | A1-2 | A2-1 | A2-2 | A3-1 | A3-2 | A4-1 | A4-2 |
|---|---|---|---|---|---|---|---|---|
| Latex | L-1 | L-1 | L-2 | L-2 | L-3 | L-3 | L-4 | L-4 |
| Nonionic reactive surfactant | Used | Used | Not used | Not used | Used | Used | Not used | Not used |
| Curable resin | B1 | B2 | B1 | B2 | B1 | B2 | B1 | B2 |
| Layer structure of toughness modifier | Bilaminar | Bilaminar | Bilaminar | Bilaminar | Trilaminar | Trilaminar | Trilaminar | Trilaminar |

Examples 1 to 4, Comparative Examples 1 to 6

According to each of the formulations shown in Tables 2 and 3, a curable resin and a thermoplastic resin were heated to 120° C. under stirring to uniformly mix them. A dispersion of a toughness modifier in a curable resin and a curing agent were added to the uniform mixture according to the formulation shown in Table 2 or 3, and the resulting mixture was mixed well and then defoamed to prepare a curable resin composition. This curable resin composition was poured between two glass plates with 5-mm-thick spacers interposed therebetween, and cured in a hot air oven at 100° C. for two hours and then at 175° C. for four hours to give a 5-mm-thick cured sheet. Tables 2 and 3 show the results of the measurements of degree of dispersion of particles, flexural modulus, and K1c of each cured sheet.

Examples 5 and 6, Comparative Examples 7 and 8

According to each of the formulations shown in Tables 2 and 3, a curable resin and a thermoplastic resin were heated to 120° C. under stirring to uniformly mix them. A dispersion of a toughness modifier in a curable resin and a curing agent were added to the uniform mixture according to the formulation shown in Table 2 or 3, and the resulting mixture was mixed well and then defoamed to prepare a curable resin composition. This curable resin composition was poured between two glass plates with 5-mm-thick spacers interposed therebetween, and cured in a hot air oven at 150° C. for one hour and then at 180° C. for two hours to give a 5-mm-thick cured sheet. Tables 2 and 3 show the results of the measurements of degree of dispersion of particles, flexural modulus, and K1c of each cured sheet.

TABLE 2

|  |  | Example | | | | | |
|---|---|---|---|---|---|---|---|
|  |  | 1 | 2 | 3 | 4 | 5 | 6 |
| Dispersion of toughness | A1-1 | 20.0 |  |  |  |  |  |
|  | A1-2 |  |  | 20.0 |  | 20.0 |  |

TABLE 2-continued

| | | Example | | | | | |
|---|---|---|---|---|---|---|---|
| | | 1 | 2 | 3 | 4 | 5 | 6 |
| modifier in curable resin | A2-1 | | | | | | |
| | A2-2 | | | | | | |
| | A3-1 | | 20.0 | | | | |
| | A3-2 | | | | 20.0 | | 20.0 |
| | A4-1 | | | | | | |
| | A4-2 | | | | | | |
| Curable resin | B1 | 46.9 | 46.9 | | | | |
| | B2 | | | 54.6 | 54.6 | 50.9 | 50.9 |
| Curing agent | C1 | 26.2 | 26.2 | 17.7 | 17.7 | | |
| | C2 | | | | | 21.8 | 21.8 |
| Thermoplastic resin | D1 | 6.9 | 6.9 | 7.7 | 7.7 | 7.3 | 7.3 |
| Degree of dispersion of particles | Good/Poor | Good | Good | Good | Good | Good | Good |
| Flexural modulus | GPa | 2.96 | 2.96 | 2.20 | 2.28 | — | — |
| K1c | Mpa · m$^{1/2}$ | 0.806 | 0.755 | 0.809 | 0.917 | — | — |

TABLE 3

| | | Comparative Example | | | | | | | |
|---|---|---|---|---|---|---|---|---|---|
| | | 1 | 2 | 3 | 4 | 5 | 6 | 7 | 8 |
| Dispersion of toughness modifier in curable resin | A1-1 | | | | | | | | |
| | A1-2 | | | | | | | | |
| | A2-1 | | 20.0 | | | | | | |
| | A2-2 | | | | | 20.0 | | 20.0 | |
| | A3-1 | | | | | | | | |
| | A3-2 | | | | | | | | |
| | A4-1 | | | 20.0 | | | | | |
| | A4-2 | | | | | | 20.0 | | 20.0 |
| Curable resin | B1 | 65.1 | 46.9 | 46.9 | | | | | |
| | B2 | | | | 73.3 | 54.6 | 54.6 | 50.9 | 50.9 |
| Curing agent | C1 | 27.7 | 26.2 | 26.2 | 18.6 | 17.7 | 17.7 | | |
| | C2 | | | | | | | 21.8 | 21.8 |
| Thermoplastic resin | D1 | 7.2 | 6.9 | 6.9 | 8.1 | 7.7 | 7.7 | 7.3 | 7.3 |
| Degree of dispersion of particles | Good/Poor | — | Poor | Poor | — | Good | Good | Poor | Poor |
| Flexural modulus | GPa | 3.13 | 2.84 | 2.90 | 2.42 | 2.15 | 2.18 | — | — |
| K1c | Mpa · m$^{1/2}$ | 0.553 | 0.759 | 0.683 | 0.618 | 0.768 | 0.783 | — | — |

Comparing the results of the examples and comparative examples, it is found that the toughness modifiers of the present invention were excellent in dispersibility in a curable resin containing a thermoplastic resin, and the curable resin compositions of the present invention were excellent in physical properties after curing.

The invention claimed is:

1. A curable resin composition, comprising
20 to 99.5% by mass of a curable resin (D) which is at least one selected from the group consisting of unsaturated polyester resins, vinyl ester resins, acrylate resins, phenolic resins, epoxy resins and cyanate resins,
a thermoplastic resin (F) which is at least one selected from the group consisting of polyethersulfone, polyetherimide, phenoxy resins and novolac resins and
0.5 to 80% by mass of a toughness modifier,
wherein the toughness modifier being obtained by emulsion-polymerizing, in the presence of 50 to 95% by mass of a rubber polymer (A) latex (calculated as a rubber polymer component), 5 to 50% by mass of a vinyl monomer (B) using 0.5 to 15 parts by mass of a nonionic reactive surfactant (C) (relative to 100 parts by mass of a total of (A) and (B)) which is a polyoxyalkylene alkenyl ether.

2. The curable resin composition according to claim 1, wherein the composition is prepared by a method comprising the steps of:
a first step of mixing an aqueous latex containing the toughness modifier with an organic solvent having a solubility in water at 20° C. of 5 to 40% by mass, and then with excess water to allow the toughness modifier to loosely aggregate;
a second step of separating and recovering the loose aggregates of the toughness modifier from a liquid phase, and then mixing the recovered toughness modifier with an organic solvent again to prepare a dispersion of the toughness modifier in the organic solvent; and
a third step of further mixing the dispersion in the organic solvent with the curable resin (D), and then distilling off the organic solvent.

3. The curable resin composition according to claim 1, wherein the rubber polymer (A) comprises a rubber elastic body formed from 50 to 100% by mass of at least one monomer selected from diene monomers and (meth)acrylate monomers, and 0 to 50% by mass of another copolymerizable vinyl monomer; a polysiloxane rubber elastic body; or a mixture thereof, and the vinyl monomer (B) comprises at least one selected from the group consisting of (meth)acrylate monomers, aromatic vinyl monomers, vinyl cyanide monomers, unsaturated acid derivatives, (meth)acrylic acid amide derivatives, and maleimide derivatives.

4. The curable resin composition according to claim 1, wherein the nonionic reactive surfactant (C) is represented by the formula (1):

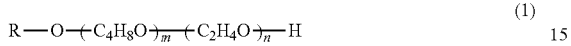

(1)

wherein R represents a terminal double bond-containing alkenyl group; m denotes a number from 2 to 50; and n denotes a number from 2 to 100.

5. The curable resin composition according to claim 1, wherein the toughness modifier has a trilaminar structure and is obtained by polymerizing, in the presence of the rubber polymer (A) latex, a vinyl monomer (B1) and a monomer (E) that has at least two radically polymerizable groups per molecule, to form an intermediate coating layer, followed by emulsion polymerization of a vinyl monomer (B2) using the nonionic reactive surfactant (C).

6. The curable resin composition according to claim 1, wherein the toughness modifier is dispersed as primary particles in a matrix of a cured product formed from the curable resin composition.

7. A cured product, formed from the curable resin composition according to claim 1.

8. A method of producing curable resin composition, comprising 20 to 99.5% by mass of a curable resin (D) which is at least one selected from the group consisting of unsaturated polyester resins, vinyl ester resins, acrylate resins, phenolic resins, epoxy resins and cyanate resins, a thermoplastic resin (F) which is at least one selected from the group consisting of polyethersulfone, polyetherimide, phenoxy resins and novolac resins and 0.5 to 80% by mass of a toughness modifier, wherein the resin composition is prepared by a method of producing the resin composition comprising:

a first step of mixing an aqueous latex containing the toughness modifier with an organic solvent having a solubility in water at 20° C. of 5 to 40% by mass, and then with excess water to allow the toughness modifier to loosely aggregate;

a second step of separating and recovering the loose aggregates of the toughness modifier from a liquid phase, and then mixing the recovered toughness modifier with an organic solvent again to prepare a dispersion of the toughness modifier in the organic solvent; and a third step of further mixing the dispersion in the organic solvent with the curable resin (D), and then distilling off the organic solvent, and a fourth step of adding the thermoplastic resin (F) or a mixture of the curable resin (D) and the thermoplastic resin (F), and wherein the toughness modifier is prepared by a method of producing the toughness modifier comprising emulsion-polymerizing, in the presence of 50 to 95% by mass of a rubber polymer (A) latex (calculated as a rubber polymer component), 5 to 50% by mass of a vinyl monomer (B) using 0.5 to 15 parts by mass of a nonionic reactive surfactant (C) (relative to 100 parts by mass of a total of (A) and (B)) which is a polyoxyalkylene alkenyl ether.

9. The curable resin composition according to claim 1, wherein the curable resin (D) is an epoxy resin.

10. The curable resin composition according to claim 1, wherein the thermoplastic resin (F) is a polyethersulfone.

* * * * *